United States Patent
Tamura et al.

(10) Patent No.: US 9,180,499 B2
(45) Date of Patent: Nov. 10, 2015

(54) METHOD FOR WASHING INCINERATION ASH AND DUST CONTAINED IN EXTRACTED CEMENT KILN COMBUSTION GAS

(75) Inventors: Noritoshi Tamura, Sakura (JP); Shinichiro Saito, Sakura (JP); Kenzaburou Kondou, Sakura (JP)

(73) Assignee: Taiheiyo Cement Corporation, Tokyo (JP)

( * ) Notice: Subject to any disclaimer, the term of this patent is extended or adjusted under 35 U.S.C. 154(b) by 624 days.

(21) Appl. No.: 13/579,160

(22) PCT Filed: Feb. 16, 2010

(86) PCT No.: PCT/JP2010/052254
§ 371 (c)(1),
(2), (4) Date: Oct. 22, 2012

(87) PCT Pub. No.: WO2011/101948
PCT Pub. Date: Aug. 25, 2011

(65) Prior Publication Data
US 2013/0199567 A1    Aug. 8, 2013

(51) Int. Cl.
*B09B 3/00* (2006.01)
*C04B 18/06* (2006.01)
(Continued)

(52) U.S. Cl.
CPC . *B09B 3/00* (2013.01); *C04B 18/06* (2013.01); *C04B 18/062* (2013.01);
(Continued)

(58) Field of Classification Search
CPC ........ B09B 3/00; B09B 5/00; B09B 2220/03; B01D 24/405; B01D 21/00; B01D 21/01; B01D 2247/04; C04B 7/38; C04B 18/06; C04B 18/061; C04B 18/062; B08B 3/04; B08B 7/00; C02F 1/004; C02F 1/40; C02F 2101/20
USPC ............... 134/10, 42; 210/757, 765, 767, 799
See application file for complete search history.

(56) References Cited

U.S. PATENT DOCUMENTS

2013/0092057 A1 *    4/2013    Konishi et al. ................ 106/819

FOREIGN PATENT DOCUMENTS

| JP | 2003326232 A | 11/2003 |
|---|---|---|
| JP | 2004337797 | * 12/2004 |

(Continued)

OTHER PUBLICATIONS

JP-2004337797 Abstract.*

(Continued)

*Primary Examiner* — Saeed T Chaudhry
(74) *Attorney, Agent, or Firm* — Stetina Brunda Garred & Brucker

(57) ABSTRACT

To minimize harmful effects on operation due to scale adhesion while accommodating increase in the amount of generated chlorine bypass dust and suppress facility cost and running cost including medical agent cost low when incineration ash and dust contained in extracted cement kiln combustion gas are subject to water treatment.

[Means for Solving Problems] A water treatment system 1 comprising: a dissolution tank 32 for dissolving a fly ash A in a water W; a dissolution tank 22 for dissolving a dust D contained in combustion gas extracted from a kiln exhaust gas passage running from an inlet end of a cement kiln to a bottom cyclone in a water W; and a vertical filter press 11 for separately filtering a slurry S2 fed from the dissolution tank 32 and a slurry S1 fed from the dissolution tank 22 from each other. It is possible to install water treatment facilities 33-35 for a filtrate L3 of the slurry containing fly ash discharged from the vertical filter press, and water treatment facilities 23-27 for a filtrate L1 of the slurry containing ash discharged from the filtering device.

20 Claims, 2 Drawing Sheets

(51) Int. Cl.
*C04B 20/02* (2006.01)
*B01D 21/01* (2006.01)
*C02F 1/00* (2006.01)
*C02F 1/70* (2006.01)
*C02F 101/20* (2006.01)
*C02F 103/18* (2006.01)

(52) U.S. Cl.
CPC .............. *C04B 20/023* (2013.01); *B01D 21/01* (2013.01); *B01D 2247/04* (2013.01); *C02F 1/004* (2013.01); *C02F 1/70* (2013.01); *C02F 2101/20* (2013.01); *C02F 2103/18* (2013.01); *Y02W 30/92* (2015.05)

(56) References Cited

FOREIGN PATENT DOCUMENTS

| | | |
|---|---|---|
| JP | 2004337797 A | 12/2004 |
| JP | 2009202077 A | 9/2009 |
| JP | 2009255066 A | 11/2009 |

OTHER PUBLICATIONS

International Search Report for PCT/JP2010/052254. Apr. 16, 2010.

\* cited by examiner

METHOD FOR WASHING INCINERATION ASH AND DUST CONTAINED IN EXTRACTED CEMENT KILN COMBUSTION GAS

CROSS-REFERENCE TO RELATED APPLICATIONS

The present application claims priority to International Application No. PCT/JP2010/052254 filed on Feb. 16, 2010.

STATEMENT RE: FEDERALLY SPONSORED RESEARCH/DEVELOPMENT

Not Applicable

BACKGROUND OF THE INVENTION

1. Technical Field of the Invention

The present invention relates to a method and a system for washing incineration ash generated when urban garbage and the like is burned and dust contained in combustion gas extracted from a kiln exhaust gas passage, which runs from an inlet end of a cement kiln to a bottom cyclone.

2. Description of the Related Art

In view of risk on the exhaustion of final disposal sites, incineration ash generated at the burning of urban garbage and the like is recycled for a cement raw material in recent years. Fly ash that is included in the urban garbage incineration ash and is transported together with gas and recovered by a dust collector contains chlorine component from 10 to 20 percent, which necessitates removal of chlorine component before recycled for a cement raw material. Then, the incineration fly ash is utilized for a cement raw material after soluble chloride compound included in the ash is removed through washing in a washing and desalting facility such as a belt filter.

Meanwhile, it is noticed that chlorine, sulfur, alkali and the like cause troubles such as preheater clogging in cement manufacturing facilities, and especially chlorine has the most harmful effect, so that a chlorine bypass system is used in order to remove chlorine by extracting a part of combustion gas from a kiln exhaust gas passage, which runs from an inlet end of a cement kiln to a bottom cyclone.

In this chlorine bypass system, for example, as described in the patent document 1, more chlorine is distributed on fine powder side of the dust, which is generated by cooling the extracted exhaust gas, so that the dust is separated into coarse powder and fine powder by a classifier, the coarse powder is returned to a cement kiln system, and the fine powder (chlorine bypass dust) containing separated potassium chloride and the like are recovered, and are added to a cement grinding mill system.

However, in recent years, recycling of waste including the incineration ash through conversion to cement raw material or fuel has been promoted and the quantity of the treated waste increases, which increases the quantity of volatile component such as chlorine brought to cement kilns. As a result, the quantity of the generated chlorine bypass dust increases also. Therefore, all of the chlorine bypass dust cannot be utilized in cement grinding process, so that the chlorine bypass dust also has been treated by washing.

In addition, the quantity of heavy metals brought to cement kilns increases as the quantity of the treated waste at cement manufacturing facilities increases, which may cause heavy metals to exceed allowable concentrations in cement. Therefore, for example, in a treatment for converting into cement raw material described in the patent document 2, desalting chlorine bypass dust and the like, which was washed in the past; adding water to waste including chlorine to allow chlorine in the waste to elute; filtrating the slurry to utilize obtained desalted cake as a cement raw material; removing heavy metals such as copper and lead by purifying the filtrate to promote effective utilization of chlorine bypass dust without causing environmental pollution.

Meanwhile, into the cement manufacturing processes are brought selenium (Se) and thallium (Ti) in addition to copper, lead and the like described above. For example, pulverized coal supplied to cement kilns and calciners contains approximately 1 ppm of thallium, and waste tires supplied thereto contains approximately 8 ppm of thallium. Since the thallium has a low boiling point and volatilizes between a kiln and a preheater of a cement burning device and most of the thallium concentrates at the preheater, as a result, the thallium is included, for instance, in a wastewater after chlorine bypass dust is treated.

As described above, conventionally, to recycle urban garbage incineration ash and the like as cement raw material, it might be necessary to remove chlorine component from fly ash and chlorine bypass dust and to remove heavy metals such as thallium, lead, selenium and the like from a filtrate obtained by washing the chlorine bypass dust, so that it is necessary to install a plurality of treatment facilities and to place workers to each treatment facility, which causes drastic rises of facility cost and running cost.

In this regard, in the patent document 3 is described a method for suppressing facility cost and running cost low when the urban garbage incineration ash and the like are recycled as a cement raw material by simultaneously performing washing incineration ash and chlorine bypass dust, and removing one or more selected from thallium, lead and selenium eluting in a filtrate obtained after the washing by adding sulfurizing agent and/or reducing agent to the filtrate.

Patent document 1: World Patent Publication WO97/21638 pamphlet
Patent document 2: Japanese Patent Publication 2000-281398 gazette
Patent document 3: Japanese Patent Publication 2007-268398 gazette However, the quantity of the generated chlorine bypass dust has recently been increasing with further increase of the quantity of the treated waste including incineration ash described above. Thus, in case that incineration ash and chlorine bypass dust are simultaneously washed with the incineration ash treating method described in the patent document 3, medical agents for removing selenium and thallium, which are included in the chlorine bypass dust but are not included in the incineration ash, disperse allover the filtrate after the washing, so that a plenty of medical agent is consumed, resulting in drastic rise of medical cost. In addition, when mixing the filtrate after washing the incineration ash, which has high calcium concentration, and the filtrate after washing the chlorine bypass dust, which has high $SO_4$ concentration, with each other, calcium sulfate ($CaSO_4$) is generated, which prevents stable operation of a filtering device and a downstream wastewater treatment process due to scale adhering thereto. On the other hand, when independent washing facilities for separately washing the incineration ash and the chlorine bypass dust are installed, this causes facility cost and running cost to double.

SUMMARY OF THE INVENTION

The present invention has been made in consideration of the above problems in the conventional techniques, and the object thereof is to minimize harmful effects on operation due to scale adhesion while accommodating increase in the amount of generated chlorine bypass dust, and to suppress facility cost and running cost including medical agent cost low when incineration ash and dust contained in extracted cement kiln combustion gas are subject to water treatment.

To achieve the above object, the present invention relates to a method of washing incineration ash and dust contained in extracted cement kiln combustion gas, and the method is characterized by comprising the steps of: when an incineration ash and a dust contained in a combustion gas extracted from a flow passage from an inlet end of a cement kiln to a bottom cyclone are washed, dissolving the incineration ash in a water; dissolving the dust in a water; and separately filtering a slurry including the incineration ash and a slurry including the dust from each other with a common filtering device.

With the present invention, the filtrations of the slurry containing incineration ash and the slurry containing dust are separately performed with a common filtering device, which makes it possible to perform filtration for each slurry with a common filtering device while enabling treatment for each slurry in accordance with their features in downstream processes. As a result, facility cost and running cost can be decreased when the incineration ash and the dust contained in an extracted combustion gas are washed. In addition to the above, it becomes possible to avoid mixing a filtrate after washing the incineration ash with high calcium concentration and a filtrate after washing the chlorine bypass dust with high $SO_4$ concentration with each other in a filtering device, which prevents scale adhesion in the filtering device and in a downstream wastewater treatment process, therefore, stable operation can be maintained without adding expensive antiscale agent (sodium carbonate).

In the method of washing incineration ash and dust contained in extracted cement kiln combustion gas, it is possible to separately perform water treatment for a filtrate of the slurry including the incineration ash discharged from the filtering device and water treatment for a filtrate of the slurry including the dust discharged from the filtering device. This allows the water treatment to be performed with chemicals suitable for target components of the filtrate of each slurry, resulting in reduced chemical cost.

In addition, in the method of washing incineration ash and dust contained in extracted cement kiln combustion gas, after separately performing water treatments for filtrates of the slurries including the incineration ash only and the dust only, the filtrates can be mixed with each other after the water treatments. With this, concentrations of selected components can also be decreased. Further, downstream facilities after each filtrate is mixed is sheared, which decreases facility cost.

Further, the filtering device can be batch-type to easily switch between filtering of the slurry including the incineration ash and filtering of the slurry including the dust.

The water treatment for the filtrate including the incineration ash can target one or more selected from a group consisting of lead, zinc and copper, and the water treatment for the filtrate including the dust may target one or more selected from a group consisting of selenium, thallium, lead, zinc and copper. In addition, in the water treatment for a filtrate after washing the dust can be used one or more selected from a group consisting hydrochloric acid, ferrous chloride, ferrous sulfate, sodium hydrogen sulfide, sodium sulfide, caustic soda and lime milk.

Further, the method of washing incineration ash and dust contained in extracted cement kiln combustion gas described above may further comprises the steps of discharging the filtrate after washing the incineration ash after wastewater treatment; and effectively utilizing the filtrate after washing the dust. The filtrate after washing the dust can be utilized as chemical fertilizers, raw materials for reagents and food additives, chemical agents for cleaning and other raw materials for chemical industry. Reusing the filtrate after washing the dust saves effort of wastewater treatment and suppresses operation cost low also.

As described above, with the present invention, it becomes possible to minimize harmful effects on operation due to scale adhesion while accommodating increase in the amount of generated chlorine bypass dust and suppress facility cost and running cost including medical agent cost low when incineration ash and dust contained in extracted cement kiln combustion gas are subject to water treatment.

DETAILED DESCRIPTION OF THE INVENTION

Next, an embodiment of the present invention will be explained with reference to drawings in detail.

Figure 1:
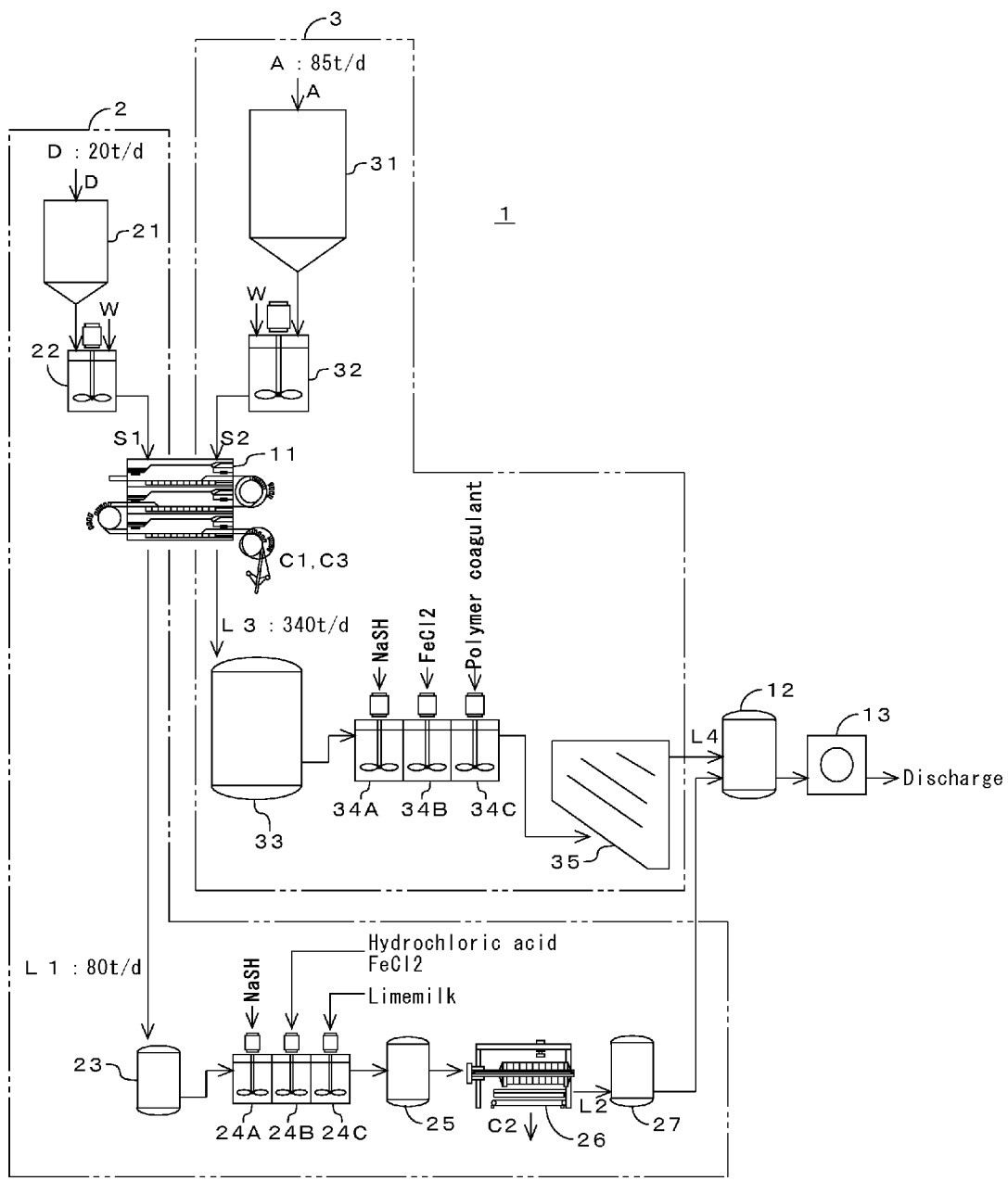
FIG. 1 is a flowchart showing an embodiment of the washing system according to the present invention.

FIG. 1 shows an embodiment of a system for washing incineration ash and dust contained in combustion gas extracted from cement kiln (hereinafter referred to as "washing system") according to the present invention, and the washing system 1 is roughly composed of a dust washing treatment system 2 for washing a dust contained in a combustion gas extracted from a flow passage from an inlet end of a cement kiln to a bottom cyclone (hereinafter referred to as "dust") D, an ash washing treatment system 3 for washing incineration ash (hereinafter referred to as "fly ash") A and a common system including a vertical filter press 11, a mixing tank 12 and a drum filter 13.

The dust washing treatment system 2 is installed to purify a filtrate L1 by removing heavy metals from the filtrate L1 generated after removing chlorine through washing of the dust D. The dust washing treatment system 2 is composed of a dust tank 21 for reserving the dust D, a dissolution tank 22 for generating slurry by adding water to the dust D, a filtrate tank 23 for storing the filtrate L1 generated by solid-liquid separation in the vertical filter press 11, chemical reaction tanks 24 (24A-24C) for removing heavy metals from the filtrate L1, a slurry tank 25, a filter press 26 and a filtrate tank 27.

The chemical reaction tank 24A is installed to add sodium hydrogen sulfide (NaSH) as a sulfurizing agent to the filtrate L1 in order to generate lead sulfide (PbS) and thallium sulfide by sulfurizing lead and thallium included in the filtrate L1. The chemical reaction tank 24B is installed to add a ferrous compound (ferrous chloride ($FeCl_2$) is exemplified in the figure) functioning as a coagulant and selenium reducing agent to the filtrate L1, to which the sulfurizing agent is added, in order to coagulate lead sulfide and thallium sulfide and reduce hexavalent selenium or quadrivalent selenium in the filtrate L1 to zero-valent selenium. In addition, the chemical reaction tank 24B is installed to discharge carbonate radical, which obstructs removal of selenium, as a gas by adjusting pH less or equal to 4 through addition of hydrochloric acid. The chemical reaction tank 24C is installed to add lime milk as an alkali agent to the filtrate L1 whose pH is adjusted to less or equal to 4 through addition of the sulfurizing agent and ferrous compound so as to make pH of the filtrate L1 more or equal to 7.5 and less or equal to 11, which is the most preferable pH range for the reduction of selenium.

The filter press 26 is disposed to solid-liquid separate the slurry for the slurry tank 25, and separate thallium sulfide, lead sulfide and selenium from the slurry.

On the other hand, the ash washing treatment system 3 is disposed to wash the fly ash A to remove chlorine, and the system 3 removes heavy metals from generated filtrate L3 to purify it. The ash washing treatment system 3 is composed of a fly ash tank 31 for reserving the fly ash A, a dissolution tank 32 for generating a slurry S2 by adding water to the fly ash A, a filtrate tank 33 for storing the filtrate L3 that is generated through solid-liquid separation of the slurry S2 by the vertical filter press 11, chemical reaction tanks 34 (34A-34C) for removing heavy metals from the filtrate L2, and a precipitator 35.

The chemical reaction tank 34A is installed to add sodium hydrogen sulfide as a sulfurizing agent to the filtrate L3, and sulfurize lead in the filtrate L3 to generate lead sulfide. The chemical reaction tank 34B is installed to add ferrous chloride or the like as a coagulant and reducing agent and precipitate heavy metals such as lead. The chemical reaction tank 34C is disposed to add a polymer coagulant in order to improve aggregation property of heavy metals and the like and accelerate sedimentation of the heavy metals.

The precipitator 35 is disposed to precipitate heavy metals and the like and to recover them. The precipitator 35 is an inclination-plate-type precipitator with a plurality of separation plates that are inclined at prescribed angles.

The vertical filter press 11, the mixing tank 12 and the drum filter 13 are commonly used for the dust washing treatment system 2 and the ash washing treatment system 3.

The vertical filter press 11 is disposed to separately perform solid-liquid separation of the slurry S1 fed from the dissolution tank 22 and the solid-liquid separation of slurry S2 fed from the dissolution tank 32. This vertical filter press 11 is composed of a plurality of filter plates that are horizontally arranged and longitudinally stacked, a jack (not shown) for lifting each filter plate, a plurality of guide rollers disposed at sides, and an endless filter cloth attached to the plurality of guide rollers, and the vertical filter press 11 is a batch-type filtering device, in which the filter cloth runs on the upper surface of each filter plate.

The mixing tank 12 and the drum filter 13 are disposed to collect suspended substances of heavy metals and the like remaining in the filtrates from the precipitator 35 and the filtrate tank 27, and purify a wastewater.

Next, a washing method of the present invention with the above washing system 1 will be explained with reference to FIG. 1. In the washing method of the present invention, filtration and water treatment for the slurry including the dust D is carried out with the dust washing treatment system 2 and the common system, and filtration and water treatment for the slurry including the fly ash A is carried out with the ash washing treatment system 3 and the common system. Then, at first, motion of the dust washing treatment system 2 with the common system will be explained.

When operation starts, firstly, in the dissolution tank 22 is mixed the dust D from the dust tank 21 and water with each other to generate the slurry S1 and chlorine components included in the dust D is dissolved in the water. The slurry S1 is fed from the dissolution tank 22 to the vertical filter press 11 to solid-liquid separate the slurry S1. A cake C1 generated at the vertical filter press 11 is fed to cement kilns or the like as a cement raw material and so on, on the other hand, the filtrate L1 including chlorine component is supplied to the filtrate tank 23 for temporary reservation.

Next, the filtrate L1 stored in the filtrate tank 23 is supplied to the chemical reaction tank 24A, and in the chemical reaction tank 24A is added sodium hydrogen sulfide as a sulfurizing agent to the filtrate L1. With this, lead and thulium in the filtrate L1 are sulfurized to generate lead sulfide and thulium sulfide. It is possible to use sodium sulfide ($Na_2S$) other than sodium hydrogen sulfide as a sulfurizing agent.

Next, in the chemical reaction tank 24B, hydrochloric acid is added to the filtrate L1 to adjust pH of the filtrate L1 less or equal to 4, which discharges carbonate radical dissolving in the filtrate L1 as a gas. Further, to the filtrate L1 whose pH is adjusted is added ferrous chloride functioning as a coagulant and selenium reducing agent to coagulate lead sulfide and thallium sulfide and reduce hexavalent selenium or quadrivalent selenium in the filtrate L1 to zero-valent selenium. In place of ferrous chloride, ferrous sulfate ($FeSO_4$) can be used.

Then, in the chemical reaction tank 24C, to the filtrate L1 whose pH becomes less or equal to 4 by the addition of the chemical is added an alkaline agent to make the pH of the filtrate L1 more or equal to 7.5 and less or equal to 11, which is the most preferable pH range for the reduction of selenium.

Next, via the slurry tank 25 and by the filter press 26 is solid-liquid separated the filtrate L1 from the chemical reaction tank 24C, and lead sulfide, thallium sulfide and selenium are recovered, and then, the second filtrate L2 is fed to the mixing tank 12 via the filtrate tank 27. The second cake C2 generated at the filter press 26 is reused as a cement raw material and the like.

Next, motion of the ash washing treatment system 3 with the common system will be explained.

When operation starts, firstly, in the dissolution tank 32, the fly ash A from the fly ash tank 31 is mixed with water to generate the slurry S2 and chlorine component included in the fly ash A is dissolved in the water. The slurry S2 is fed from the dissolution tank 32 to the vertical filter press 11 to solid-liquid separate the slurry S2. The cake 3 generated at the vertical filter press 11 is fed to cement kilns or the like as a cement raw material or the like, on the other hand, the filtrate L3 containing chlorine component is supplied to the filtrate tank 33 for temporary reservation.

The filtrate L3 from the filtrate tank 33 is fed to the chemical reaction tank 34A to sulfurize lead in the filtrate L3 to lead sulfide. Next, in the chemical reaction tank 34B, lead sulfide precipitates through agglutination function of ferrous chloride, in the chemical reaction tank 34C, polymer coagulant allows the deposit to be aggregated so as to become larger particles.

Then, the precipitator 35 separates the deposit through precipitation. The deposit obtained in the precipitator 35 is stored in a sludge pit not shown, and is solid-liquid separated in a filter press or the like, and a cake obtained is used as a cement raw material and others.

Next, a supernatant liquid L4 from the precipitator 35 is fed to the mixing tank 12 so as to be mixed with the filtrate L2 from the filtrate tank 27 of the dust washing treatment system 2.

In the mixing tank 12, heavy metals and others remaining in the supernatant liquid L4 from the precipitator 35 and in the filtrate L2 from the filtrate tank 27 are collected; in the drum filter 13, heavy metals and suspended substances remaining in a filtrate from the mixing tank 12 are removed; and dilution water is added to release it through sewage lines or the like.

In the above embodiment, selenium, thulium and lead in the filtrate L1 are removed by using the dust washing treatment system 2 and the common system. In addition, zinc, copper and the like can also be removed. In place of sodium hydrogen sulfide, sodium sulfide may be used, and caustic soda may be used instead of lime milk, and they can be used at the same time.

In addition, when the filtrate L3 is water treated with the ash washing treatment system 3 and the common system also, zinc, copper and so on can be removed besides lead. In place of sodium hydrogen sulfide, sodium sulfide and liquid chelate can be used, and offerric chloride can be used instead of ferrous chloride, and they can be used at the same time. Further, caustic soda can be used for pH control and so on.

As explained above, in the present invention, the filtration for the slurry including the dust D and the filtration for the slurry including the fly ash A are carried out with the common vertical filter press 11, and the mixing tank 12 and the drum filter 13 are commonly used, which can suppress facility cost and operation cost low. In addition, the slurry S2 containing the fly ash A with high calcium concentration (shown in Table 1) and the slurry S1 containing the dust D with high $SO_4$ concentration (shown in Table 2) are separately solid-liquid separated by the vertical filter press 11, so that scale of calcium sulfate ($CaSO_4$) is not generated in the filter press 11, therefore, it is possible to maintain stable operation without adding expensive antiscale agent (sodium carbonate). Further, water treatment for the slurry S1 containing the dust D and water treatment for the slurry S2 containing the fly ash A are separately performed in accordance with their features, which reduces chemical cost. The effect that the chemical cost is reduced will be specifically explained with test examples described below.

Table 1 shows concentrations of heavy metals contained in a filtrate after washing the fly ash A alone. As shown in the table, in the filtrate is contained lead and zinc but selenium and thallium are not contained, and copper is slightly contained.

TABLE 1

| Flyash A alone | | | | | | | |
|---|---|---|---|---|---|---|---|
| | Pb | Se | Tl | Zn | Cu | Ca | $SO_4$ |
| Filtrate after washing | 160 | 0.0 | 0.0 | 7.1 | 0.09 | 11000 | 1200 |

Table 2 shows concentrations of heavy metals contained in a filtrate after washing the dust D alone. As shown in the table, in the filtrate is contained selenium and thallium other than lead, therefore, it is necessary to remove them through wastewater treatment before released.

TABLE 2

| Dust D alone | | | | | | | |
|---|---|---|---|---|---|---|---|
| | Pb | Se | Tl | Zn | Cu | Ca | $SO_4$ |
| Filtrate after washing | 200 | 3.0 | 25 | <0.5 | <0.5 | 1900 | 6600 |

Table 3 shows concentrations of heavy metals contained in a filtrate after mixing the fly ash A and the dust D and washing them. Here, the mixing ratio of the fly ash A and the dust D corresponds to the ratio of the amount of those materials that are treated in a day shown in FIG. 1. That is, the fly ash A:85t/d (treated amount(ton) per day), the dust D:20t/d, so that the ratio of the dust D to the total is 20/(85+20)×100=19.1%.

TABLE 3

| Mixing Washing | | | | | |
|---|---|---|---|---|---|
| | Pb | Se | Tl | Zn | Cu |
| Filtrate after washing | 200 | 0.5 | 2 | 2.4 | 0.12 |
| 6000 | <0.1 | 0.1 | <0.1 | <0.5 | <0.5 |
| Discharge standard value | <0.1 | <0.1 | (<0.1) | <5 | <3 |

As shown in the uppermost cells of the table, many kinds of heavy metals are contained in the filtrate after mixing washing, so that it is necessary to make the concentrations of the heavy metals through wastewater treatment below the discharge standard values described in the third cells from the top. Especially, in order to remove selenium, a plenty of ferrous chloride must be added, and "6000" described in the second cells from the top means that concentrations of heavy metals after 6000 mg/l of ferrous chloride as Fe is added. Adding this amount of ferrous chloride allows concentration of selenium to reach substantially the discharge standard value, and allows concentrations of other heavy metals to become below the discharge standard values.

On the other hand, Table 4 shows concentrations of heavy metals when to a filtrated after washing the dust D alone is added 6000 mg/l of ferrous chloride as Fe and is diluted with a filtrated after washing the fly ash A alone. The "6000" described in the second cells from the top means that concentrations of heavy metals after 6000 mg/l of ferrous chloride as Fe is added. "Dilution" in the third cells from the top means concentrations of heavy metals after adding ferrous chloride and diluting it with a filtrate after washing the fly ash A alone. As shown in the third cells of "Dilution", concentrations of all of the heavy metals including selenium become below the discharge standard values.

TABLE 4

| Dust D alone | | | | | |
|---|---|---|---|---|---|
| | Pb | Se | Tl | Zn | Cu |
| Filtrate after washing | 200 | 3.0 | 25 | <0.5 | <0.5 |
| 6000 | <0.1 | 0.38 | <0.1 | <0.5 | <0.5 |
| Dilution | <0.1 | 0.07 | <0.1 | <0.5 | <0.5 |
| Discharge standard value | <0.1 | <0.1 | (<0.1) | <5 | <3 |

Here, we compare amounts of ferrous chloride (as Fe) used when 340t/d of filtrate of the fly ash A and 80t/d of filtrate of the dust D are treated between Case A, where mixing washing of the fly ash A and the dust D is performed, and Case B, where ferrous chloride is added to a filtrate of the dust D alone and then it is diluted with a filtrate of the fly ash A alone. Specific gravity of the filtrate after washing is 1.09 kg/l.

In Case A, 6000 mg/l÷1.09 kg/l×(340+80)t/d=2,311 kg/d, so that 2,311 kg/d of ferrous chloride (Fe) is consumed.

On the other hand, in Case B, 6000 mg/l÷1.09 kg/l×80 t/d=440 kg/d, so that 440 kg/d of ferrous chloride (Fe) is consumed.

As described above, it is proved that $FeCl_2$ consumption in Case B is one fifth in comparison to Case A.

Figure 2:
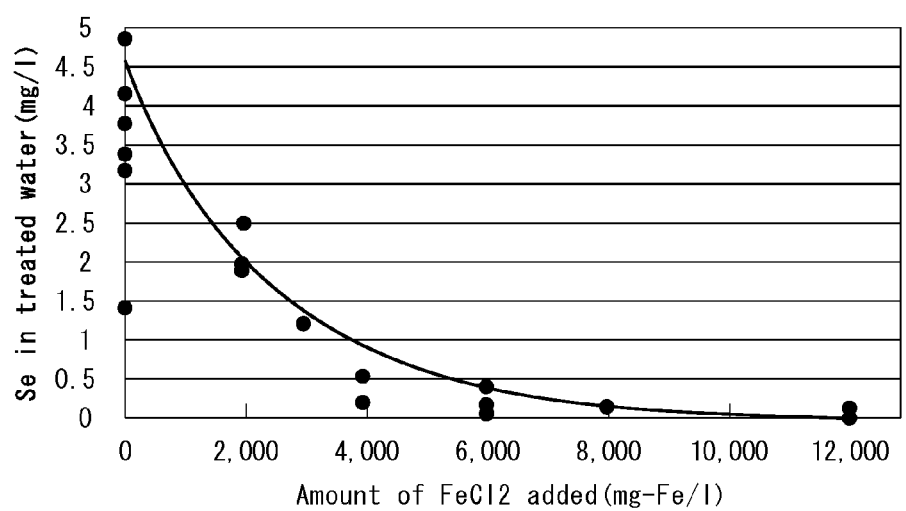
FIG. 2 is a graph showing the relationship between the amount of ferrous chloride added and selenium concentration of treated water when selenium is removed with ferrous chloride.

FIG. 2 shows the relation between the amount of ferrous chloride added when selenium (Se) is removed with ferrous chloride ($FeCl_2$) and concentration of selenium in a treated water. As shown in the figure, it is understood that the amount of ferrous chloride to be added increases as the concentration of selenium decreases. Especially, in order to decrease the concentration of selenium from 0.5 mg/l to 0.1 mg/l, 6000 mg-Fe/l of ferrous chloride, that is, a plenty of ferrous chloride must be added. On the other hand, in case that the concentration of selenium is decreased from 3.0 mg/l to 0.38 mg/l also, approximately 6000 mg-Fe/l of ferrous chloride is required to be added. After that, dilution with a filtrate after washing the fly ash A that does not contain selenium allows its concentration to become below the discharge standard value, and based on the difference of the amounts of filtrate to be treated, the quantity of ferrous chloride to be added can considerably be reduced.

Meanwhile, although in the above embodiment is explained a case where a batch-type vertical filter press 11 is used as a filtering device for separately performing filtration of a slurry including the fly ash A and filtration of a slurry including the dust D, a batch-type horizontal filter press as well as a continuous belt filter may be used.

In addition, in the above embodiment, the filtrate after washing the fly ash A and the filtrate after washing the dust D are mixed with each other in the mixing tank 12, all or a part of the filtrate after washing the dust D can effectively be utilized for other uses.

For example, in the filtrate after washing the dust D is contained potassium that can be used for chemical fertilizer, so that the filtrate after washing can directly be utilized as industrial material such as a raw material for chemical fertilizer. In addition, the filtrate can be utilized as industrial material after suspended substances such as heavy metals contained therein are collected with the drum filter 13 shown in FIG. 1 and others and wastewater treatment is applied.

Further, in the filtrate after washing the dust D is contained salts such as sodium chloride and potassium chloride, and these salts are recovered so as to be utilized as industrial material or the like. These salts can be recovered with crystallizers and so on. The crystallizer is a device for precipitating solute by increasing particle size of crystallized solute and recovering the solute with a centrifugal separator, and sodium chloride is crystallized with a heating-type device and potassium chloride is crystallized with a cold-type device. In addition, the salts can be recovered after wastewater treatment for removing heavy metals and others from a filtrate after washing.

Further, although in the above embodiment, fly ash as an incineration ash is washed as an example, the present invention is applied when bottom ash, in place of the fly ash, is washed, and it is also possible to simultaneously wash the fly ash and the bottom ash.

Still further, devices, kinds of chemicals, amount of materials to be treated per day are described as examples only, and it is a matter of course that those can be changed appropriately without departing from the sprit and the purpose of the present invention.

EXPLANATION OF REFERENCE NUMBERS 1 washing system
2 dust washing treatment system
3 ash washing treatment system
11 vertical filter press
12 mixing tank
13 drum filter
21 dust tank
22 dissolution tank
23 filtrate tank
24 (24A-24C) chemical reaction tanks
25 slurry tank
26 filter press
27 filtrate tank
31 fly ash tank
32 dissolution tank
33 filtrate tank
34 (34A-34C) chemical reaction tanks
35 precipitator
A fly ash
C1-C3 cakes
D dust
L1-L3 filtrates
L4 supernatant liquid
S1-S2 slurries

The invention claimed is:

1. A method of washing incineration ash and dust contained in extracted cement kiln combustion gas comprising the steps of:
   dissolving an incineration ash in a water;
   dissolving a dust contained in a combustion gas extracted from a flow passage from an inlet end of a cement kiln to a bottom cyclone in a water; and
   separately filtering a slurry including the incineration ash and a slurry including the dust from each other with a common filtering device.

2. The method of washing incineration ash and dust contained in extracted cement kiln combustion gas as claimed in claim 1 further comprising the step of separately performing water treatment for a filtrate of the slurry including the incineration ash discharged from the filtering device and water treatment for a filtrate of the slurry including the dust discharged from the filtering device.

3. The method of washing incineration ash and dust contained in extracted cement kiln combustion gas as claimed in claim 1 further comprising the step of after separately performing water treatments for filtrates of the slurries including the incineration ash only and the dust only, mixing the filtrates with each other after the water treatments.

4. The method for washing incineration ash and dust contained in extracted cement kiln combustion gas as claimed in claim 1, wherein the filtering device is batch-type.

5. The method of washing incineration ash and dust contained in extracted cement kiln combustion gas as claimed in claim 2, wherein the water treatment for the filtrate including the incineration ash targets one or more selected from a group consisting of lead, zinc and copper.

6. The method of washing incineration ash and dust contained in extracted cement kiln combustion gas as claimed in claim 2, wherein the water treatment for the filtrate including the dust targets one or more selected from a group consisting of selenium, thallium, lead, zinc and copper.

7. The method of washing incineration ash and dust contained in extracted cement kiln combustion gas as claimed in claim 2, wherein one or more selected from a group consisting of hydrochloric acid, ferrous chloride, ferrous sulfate, sodium hydrogen sulfide, sodium sulfide, caustic soda and lime milk are used for the water treatment for a filtrate after washing the dust.

8. The method of washing incineration ash and dust contained in extracted cement kiln combustion gas as claimed in claim 1 further comprising the steps of:
   discharging the filtrate after washing the incineration ash after wastewater treatment; and
   effectively utilizing the filtrate after washing the dust.

9. The method of washing incineration ash and dust contained in extracted cement kiln combustion gas as claimed in claim 2 further comprising the step of after separately performing water treatments for filtrates of the slurries including the incineration ash only and the dust only, mixing the filtrates with each other after the water treatments.

10. The method for washing incineration ash and dust contained in extracted cement kiln combustion gas as claimed in claim 2, wherein the filtering device is batch-type.

11. The method for washing incineration ash and dust contained in extracted cement kiln combustion gas as claimed in claim 3, wherein the filtering device is batch-type.

12. The method of washing incineration ash and dust contained in extracted cement kiln combustion gas as claimed in claim 3, wherein the water treatment for the filtrate including the incineration ash targets one or more selected from a group consisting of lead, zinc and copper.

13. The method of washing incineration ash and dust contained in extracted cement kiln combustion gas as claimed in claim 4, wherein the water treatment for the filtrate including the incineration ash targets one or more selected from a group consisting of lead, zinc and copper.

14. The method of washing incineration ash and dust contained in extracted cement kiln combustion gas as claimed in claim 3, wherein the water treatment for the filtrate including the dust targets one or more selected from a group consisting of selenium, thallium, lead, zinc and copper.

15. The method of washing incineration ash and dust contained in extracted cement kiln combustion gas as claimed in claim 4, wherein the water treatment for the filtrate including the dust targets one or more selected from a group consisting of selenium, thallium, lead, zinc and copper.

16. The method of washing incineration ash and dust contained in extracted cement kiln combustion gas as claimed in claim 3, wherein one or more selected from a group consisting of hydrochloric acid, ferrous chloride, ferrous sulfate, sodium hydrogen sulfide, sodium sulfide, caustic soda and lime milk are used for the water treatment for a filtrate after washing the dust.

17. The method of washing incineration ash and dust contained in extracted cement kiln combustion gas as claimed in claim 4, wherein one or more selected from a group consisting of hydrochloric acid, ferrous chloride, ferrous sulfate, sodium hydrogen sulfide, sodium sulfide, caustic soda and lime milk are used for the water treatment for a filtrate after washing the dust.

18. The method of washing incineration ash and dust contained in extracted cement kiln combustion gas as claimed in claim 2 further comprising the steps of:
 discharging the filtrate after washing the incineration ash after wastewater treatment; and
 effectively utilizing the filtrate after washing the dust.

19. The method of washing incineration ash and dust contained in extracted cement kiln combustion gas as claimed in claim 3 further comprising the steps of:
 discharging the filtrate after washing the incineration ash after wastewater treatment; and
 effectively utilizing the filtrate after washing the dust.

20. The method of washing incineration ash and dust contained in extracted cement kiln combustion gas as claimed in claim 4 further comprising the steps of:
 discharging the filtrate after washing the incineration ash after wastewater treatment; and
 effectively utilizing the filtrate after washing the dust.

\* \* \* \* \*